United States Patent [19]

Sherrill

[11] Patent Number: 4,971,294
[45] Date of Patent: Nov. 20, 1990

[54] INDUCTION HEATED SLIDING GATE VALVE FOR VACUUM MELTING FURNACE

[75] Inventor: Frank C. Sherrill, Monroe, N.C.

[73] Assignee: Teledyne Industries, Inc., Monroe, N.C.

[21] Appl. No.: 324,246

[22] Filed: Mar. 15, 1989

[51] Int. Cl.⁵ ............................................. C21C 5/42
[52] U.S. Cl. ................................ 266/208; 222/593; 266/236
[58] Field of Search ................. 222/593, 598, 600; 266/236, 207, 237, 208

[56] References Cited

U.S. PATENT DOCUMENTS

| | | | |
|---|---|---|---|
| 3,523,785 | 8/1970 | Gero | 266/237 |
| 3,550,924 | 12/1970 | Grosko | 222/600 |
| 3,567,082 | 3/1971 | Tinnes | 222/593 |
| 3,788,383 | 1/1974 | Metz | 222/600 |

FOREIGN PATENT DOCUMENTS 1077698  3/1984  U.S.S.R. ............................. 222/593

Primary Examiner—S. Kastler
Attorney, Agent, or Firm—Bell, Seltzer, Park and Gibson

[57] ABSTRACT

An apparatus for melting and pouring metal alloys includes a vacuum melt furnace having a melt chamber to receive and melt metal in a vacuum. A valve cooperates with a pour opening located at the bottom of the furnace. The valve includes an upper stationary nozzle portion formed substantially from refractory material and having an orifice aligned with the pour opening. A lower nozzle portion having an orifice therethrough is mounted adjacent and below the upper nozzle portion for slidable movement along a lower face of the upper stationary nozzle portion. The valve is opened and closed by slidably moving the lower nozzle orifice in and out of alignment with the upper nozzle orifice. An induction heating coil substantially surrounds the upper stationary nozzle portion.

13 Claims, 2 Drawing Sheets

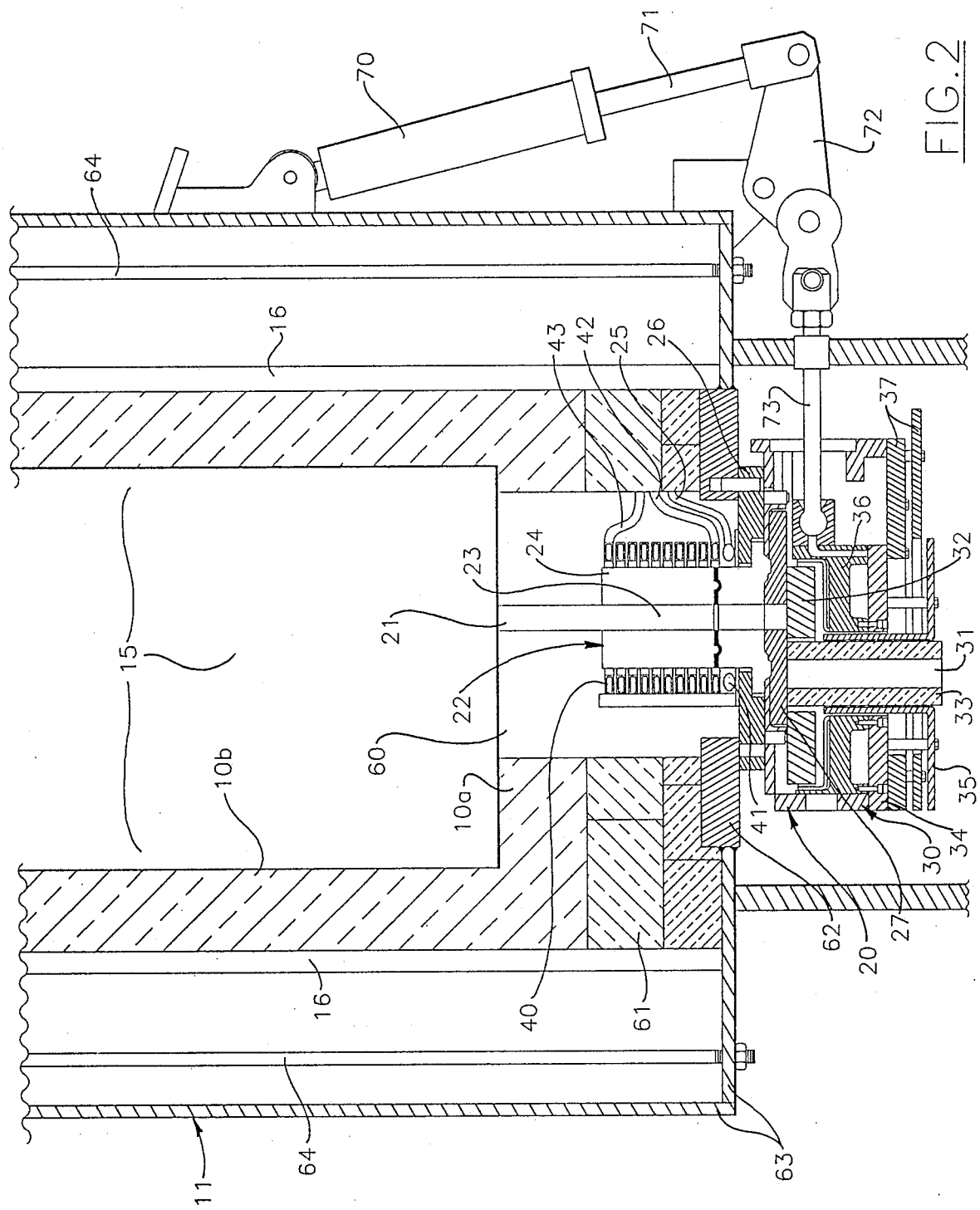

INDUCTION HEATED SLIDING GATE VALVE FOR VACUUM MELTING FURNACE

FIELD OF THE INVENTION

This invention relates to an apparatus for melting and pouring metal alloys and more particularly to an induction heated sliding gate valve used with a vacuum melting furnace.

BACKGROUND OF THE INVENTION

Vacuum melting and pouring is used in the manufacture of many metal superalloys. Melting and pouring in a strong vacuum, such as around $1 \times 10^{-2}$ Torr, not only removes harmful gases, but assures a higher purity of superalloy during the melt and in subsequent pouring. Conventionally, a large, induction heated ladle-type furnace, together with a pour mold or other holding vessel, is completely enclosed by a housing which is then evacuated. When the superalloy has been melted and refined, the ladle furnace is tilted and the melted superalloy poured directly into the mold or other holding vessel. To prevent floating slag and other impurities from entering the pour, weirs are positioned on the interior of a tundish or launder leading to the mold to capture the slag and other impurities.

However, problems have been encountered by such apparatus with the result that the quality of the poured superalloy has suffered. For example, when the furnace is tilted during a pour, often small amounts of floating slag pass beneath the weir causing low and high density inclusions to enter the melt which create unacceptable defects in the alloy. In addition, the conventional ladle-type induction furnaces use complex hydraulic and mechanical systems which, when operated in a strong vacuum, present problems in operation and maintenance. Also, a large vacuum enclosure is required for allowing clearance of the ladle-type furnace upon tilting and pouring.

A bottom-pour vacuum melt furnace would eliminate the need for a large vacuum enclosure and reduce the attendant steam injection requirements needed to pull the necessary vacuum. In addition, complex hydraulic and mechanical systems as well as slag intrusion prevention systems could be minimal. However, bottom pour systems have heretofore been found impractical for use with vacuum melting furnaces. Bottom pour systems conventionally utilize a bottom pour valve such as a sliding gate valve formed substantially from a refractory material. Often molten metal solidifies in the valve making subsequent pours impossible. An oxygen lance could remove the blockage, but its use is impractical since blown oxygen would disturb the strong vacuum balance maintained during the melt. A sand plug inserted in the valve would also prevent metal solidification. However, sand plugging is impractical since most vacuum melt furnaces require strong mixing of the melt such as accomplished through induction heating and melting. The strong mixing within a melt chamber would cause sand to dislocate from the sand plug and add impurities to the melt. To make an initial limited and small pour to remove any sand impurities would be economically impractical since the costs of superalloys are high and wastage must be eliminated.

It is therefore an object of the invention to provide a furnace for melting and pouring metal alloys having a bottom pour valve not subject to metal solidification therein.

It is another object of the invention to provide a vacuum melt induction furnace having a limited vacuum enclosure around the furnace.

It is still another object of the invention to provide a vacuum melt induction furnace having limited hydraulic and mechanical systems used for pouring metal from the furnace.

SUMMARY OF THE INVENTION

These and other objects and advantages of the present invention are accomplished by an apparatus for melting and pouring metal alloys where a furnace having bottom and sidewall portions defines a melt chamber to receive and melt metal therein. Means are provided for evacuating the chamber to allow melting of metal in a vacuum. A pour opening is located at the bottom portion of the furnace to permit removal of molten metal from the furnace.

A valve cooperates with the pour opening for controlling the flow of molten metal from the pour opening. The valve includes an upper stationary nozzle portion formed substantially from a refractory material and includes an orifice therethrough aligned with the pour opening. A lower nozzle portion is positioned below the upper stationary nozzle portion and adjacent thereto. The lower nozzle portion includes an orifice therethrough and means mounting the lower nozzle portion for slidable movement along a lower face of the upper stationary nozzle portion to open and close the pour opening by slidably moving the lower nozzle orifice in and out of alignment with the upper nozzle orifice. Induction heating means is positioned in surrounding relationship to the upper stationary nozzle portion.

In the preferred embodiment, the induction heating means includes electric power supply means and induction heating coil means operatively connected to the power supply means. The upper nozzle portion includes first and second replaceable refractory elements as well as a metallic mounting plate engaging the bottom portion of the furnace to facilitate maintenance of the upper stationary nozzle portion in engagement with the pour opening. To minimize induction heating of the mounting plate, a copper flux ring is included within the induction heating coil.

BRIEF DESCRIPTION OF THE DRAWINGS

Some of the objects and advantages of the present invention having been stated, others will be more fully understood from the detailed description which follows and by reference to the accompanying drawings in which:

FIG. 2 is an enlarged sectional view of the furnace showing in detail the structure of the induction heated sliding gate valve in accordance with the invention.

DETAILED DESCRIPTION

Figure 1:
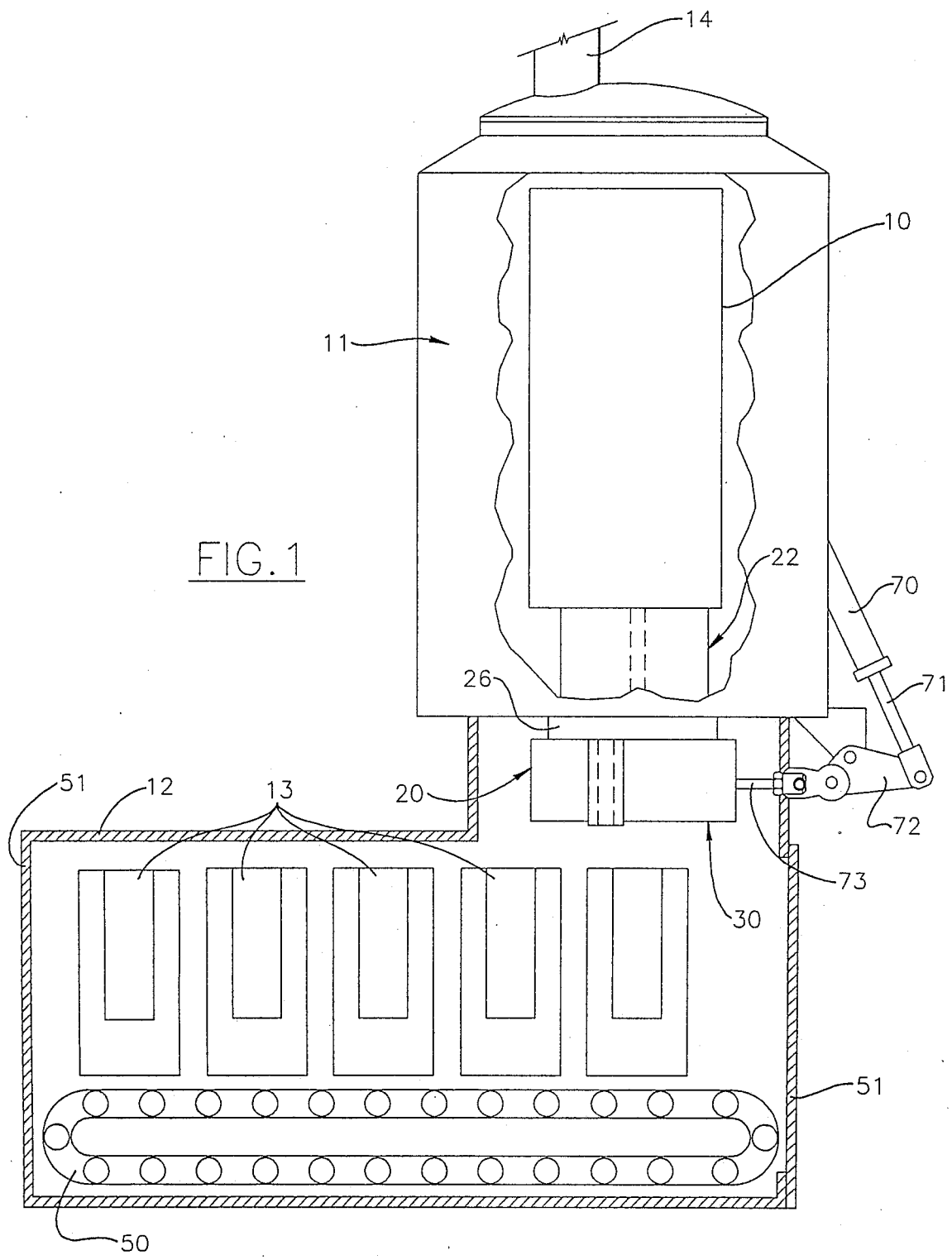
FIG. 1 is a side elevational view showing in partial section the furnace, sliding gate valve and enclosing vacuum housing in accordance with the invention.

Referring now to the drawings, and more particularly to FIG. 1, an induction heated furnace 10 is shown positioned in a steel shell-type housing 11 or vacuum chamber as hereafter referred, which completely encloses the furnace. The vacuum chamber 11 not only encloses the furnace 10, but includes a lower housing portion 12 extending substantially below the bottom of the furnace to provide an area within the vacuum chamber for molds 13 or other holding vessels to be filled with molten metal. At the top of the vacuum chamber 11, an evacuation system 14 is provided for evacuating air from the chamber to allow melting and pouring of the molten metal within a vacuum. Any conventional evacuation system may be used; however, a steam injection system preferably is used since these systems are simpler in operation and have been found reliable to quickly pull a vacuum on the order of the desired $1\times10^{-2}$ Torr.

As shown in FIG. 2, the furnace 10 includes respective bottom and sidewall portions 10a and 10b formed from a refractory material which define a melt chamber 15 to receive and melt metal therein. As is conventional with most superalloy producing furnaces, the furnace 10 is induction heated by an induction heating coil 16 substantially surrounding the refractory material of the furnace. Not only does the induction heating coil 16 provide sufficient heat for the alloy melting, but it also induces stirring of the melt for proper homogenous mixing of the alloys. A power supply (not shown) provides alternating current to induce heating and stirring of the alloy material within the melt chamber 15.

Once the melt is complete, the molten superalloy is withdrawn from the furnace 10 through the pour opening 21 located at the bottom portion of the furnace. A sliding gate pour valve 20 cooperates with the pour opening 21 for controlling the flow of molten metal from the pour opening of the furnace. As will be explained hereafter in detail, the sliding gate pour valve 20 includes an induction heating coil 40 incorporated therewith to prevent solidification of metal within the valve.

Although not illustrated in detail, the top portion of the vacuum chamber 11 is removable for charging the melt cavity 15 of the furnace 10 with the raw materials and slag agents necessary for the manufacture of a superalloy metal (FIG. 1). Once the furnace 10 is charged and then the melt completed, the sliding gate valve 20 is opened to allow controlled flow of the molten metal from the pour opening 21 and into a mold 13 positioned below the valve.

Since both melting and pouring must occur within a vacuum, the vacuum chamber 11 extends substantially below the furnace 10 with the vacuum chamber bottom portion 12 acting as a support for the furnace. Within the area defined by the vacuum chamber bottom portion 12, molds 13 are positioned on a conveyor 50 which sequentially moves the molds 13 under the sliding gate valve 20. Although five molds are illustrated, the number of molds used can range from one to seven molds. When a mold 13 has been filled, the sliding gate valve 20 is closed, and an adjacent mold is moved by conveyor to a point under the valve. That mold is then filled and the process continues with each mold being sequentially filled. Suitable air lock vacuum doors 51 can be used to assure that sufficient vacuum is maintained within the vacuum chamber 11. Other conveyors (not shown) may be positioned outside the air lock vacuum doors 51 to connect with the conveyor 50 positioned within the vacuum chamber 11 and facilitate conveying the molds into the chamber.

Since the furnace 10 is bottom tapped through the sliding gate pour valve 20, the molten superalloy metal is withdrawn from the bottom of the furnace without slag intrusion. Normally, slag floats on the melt making slag the last portion of the melt to be bottom tapped. Once the metal alloy has been poured, the slag is poured into a separate slag holding vessel.

Referring now to FIG. 2, there is shown in detail the sliding gate valve 20 having an induction heating coil 40 incorporated therein. The valve 20 includes an upper stationary nozzle portion 22 formed substantially from refractory material. An orifice 23 extends through this upper nozzle portion and is aligned with the pour opening 21. A lower nozzle portion 30 is positioned below and adjacent the upper stationary nozzle portion 22 and is mounted for slidable movement along the lower face of the upper stationary nozzle portion 22. The lower nozzle portion 30 also includes an orifice 31 extending therethrough, and as will be explained in detail hereafter, the lower nozzle portion is slidable along the lower face of the upper stationary nozzle to open and close the pour opening 21 by slidably moving the lower nozzle orifice 31 in and out of alignment with the upper nozzle orifice 23.

As illustrated, a large refractory well block 60 is permanently positioned at the lower portion of the furnace by refractory holding blocks 61 and a steel support plate 62 welded to the frame 63 defining the vacuum chamber 11. To increase frame rigidity, steel reinforcing bars 64 extend longitudinally within the vacuum chamber 11. The furnace pour opening 21 extends through a medial section of the refractory well block 60.

The lower medial portion of the refractory well block 60 is "shelled-out" during its formation and fabrication to allow insertion of a section of the upper stationary nozzle portion 22 of the sliding gate valve 20. In the preferred embodiment, this insertable section comprises respective first and second replaceable refractory elements 24, 25 held within the well block 60 by a steel mounting plate 26 bolted to the frame's steel support plate 62. A graphite rubbing plate 27 is secured to the steel mounting plate 26 so as to underlie the steel mounting plate and the second replaceable refractory element 25. The graphite rubbing plate 27 engages the face of the upper nozzle portion 22 and reduces the friction between upper and lower nozzle portions 22, 30 as they move relative to each other.

The lower nozzle portion 30 also includes a lower nozzle graphite rubbing plate 32 for slidably engaging with the graphite rubbing plate 27 of the upper nozzle portion 22. In a medial portion, the lower nozzle graphite rubbing plate 32 also includes a bore therethrough for receiving a replaceable refractory element 33 having an orifice 31 therethrough substantially the same diameter as the orifice 23 of the upper nozzle portion 22. The lower nozzle graphite rubbing plate 27 and the replaceable refractory insert 33 are secured by respective upper and lower spaced, parallel retaining plates 34, 35 bolted together. The upper retaining plate 34 is bolted to a refractory securement 36 which engages the graphite rubbing plate 32 and the lower retaining plate 35.

To hold the lower nozzle portion 30 in position against the upper stationary nozzle portion 22 and also to assure free sliding engagement thereto, the upper retaining plate 34 is supported for slidable engagement with a frame system 37 rigidly secured to the furnace frame 63 by the frame's steel support plate 62. Power for sliding the lower nozzle portion 30 relative to the upper stationary nozzle portion 22 and the frame 63 is provided by a hydraulic cylinder 70 secured to the outside of the furnace frame 63. The piston 71 of the hydraulic cylinder 70 engages a bell crank 72 pivotally secured to the furnace frame 63. A link rod 73 adjustably interconnects the lower nozzle portion 30 and the bell crank 72. When the piston 71 is extended, the link rod 73 slides the lower nozzle portion 30 toward its most extended point where the orifices 23, 31 in upper and lower nozzle portions 22, 30 are not aligned. In this position, the valve 20 effectively is closed and molten metal cannot flow from the melt cavity 15.

To open the valve 20, the piston 71 is retracted. Upon retraction, the bell crank 72 pivots to move the link rod 73 and slide the lower nozzle portion 35 toward the hydraulic cylinder 70. When the piston 71 has fully retracted, the orifices 23, 31 are aligned and the melt may discharge therethrough.

According to the present invention, an induction heating coil 40 is positioned in the refractory well block 60 and in surrounding relation to a substantial portion of the replaceable refractory elements 24, 25 of the upper stationary nozzle portion 22. During the melt, when upper and lower nozzle orifices 23, 31 are unaligned, molten metal is retained in the orifice 23 of the upper stationary nozzle portion 22. This retained metal may solidify and create a blockage, preventing molten metal flow after the sliding gate valve 20 is opened and the orifices 23, 31 are aligned.

If blockage should occur, the induction heating coil 40 can be energized and the solidified metal in the orifice 23 melted. To prevent the induction heating coil 40 from energizing the steel mounting plate 26 underlying the refractory well block 60, a copper flux ring 41 is included with the induction heating coil, and positioned as the last coil adjacent the steel mounting plate. The copper flux ring 41 is much less inductive than the remaining coil 40, thus minimizing the heating effect at the lower portion of the coil. A water line 42 connects the copper flux ring 41 to provide additional cooling for the ring 41.

Power for the induction heating coil is supplied by an alternating current power supply (not shown) having leads 43 interconnecting the power supply and the induction heating coil 40. Because of the refractory 24, the coils are located a considerable distance outwardly of the load, i.e., the metal in the orifice. This considerable distance has heretofore been considered too great a distance to effectively utilize induction heating. However, it has been found that a 30 kw power supply providing 2.2 kw to the load at 3000 KHz is sufficient to provide melting to the load in the orifice of conventionally sized induction furnaces utilized for superalloy steel production. Since the inductive index of the well block 60 and the refractory elements 24, 25 is low, this power level is necessary to assure sufficient induction heating of the load.

Depending upon the time and temperature of the melt, the coil can remain energized during the melt to prevent solidification within the orifice. Typically, each superalloy melt is unique and the range of applied power and the related time frame will depend on each melt.

The foregoing embodiment is to be considered illustrative rather than restrictive of the invention and those modifications which come within the meaning and range of equivalents of the claims to be included therein.

That which is claimed is:

1. An apparatus for melting and pouring metal alloys comprising a furnace having bottom and sidewall portions defining a melt chamber to receive and melt metal therein, a pour opening located at the bottom portion of said furnace to permit removal of molten metal from said furnace, valve means cooperating with said pour opening for controlling the flow of molten metal from the pour opening of said furnace, said valve means including an upper stationary nozzle portion formed substantially from refractory material and having an orifice therethrough aligned with said pour opening, a lower nozzle portion positioned below said upper stationary nozzle portion and adjacent thereto, said lower nozzle portion including an orifice therethrough, means mounting said lower nozzle portion for slidable movement along a lower face of said upper stationary nozzle portion to open and close said pour opening by slidably moving the lower nozzle orifice in and out of alignment with the upper nozzle orifice, and induction heating means mounted in surrounding relationship to said refractory material upper stationary nozzle portion and cooperating therewith for inductively generating heat within the orifice of said upper stationary nozzle portion.

2. The apparatus as claimed in claim 1 including means evacuating said chamber to allow melting of said metal in a vacuum.

3. The apparatus as claimed in claim 1 wherein said induction heating means includes electric power supply means and induction heating coil means operatively connected to said power supply means.

4. The apparatus as claimed in claim 1 including means engaging said lower nozzle portion for sliding said lower nozzle portion along a lower face of said upper stationary nozzle portion, said means including hydraulically actuated pivot means and means interconnecting said hydraulically actuated pivot means and said lower nozzle portion.

5. The apparatus as claimed in claim 1 wherein said upper stationary nozzle portion includes first and second replaceable refractory elements.

6. The apparatus as claimed in claim 1 wherein said upper stationary nozzle portion includes a metallic mounting plate engaging the bottom portion of said furnace to facilitate maintenance of said upper stationary nozzle portion in engagement with said pour opening, and wherein said induction heating means includes means minimizing induction heating of said mounting plate.

7. The apparatus as claimed in claim 6 wherein said means minimizing induction heating of said mounting plate includes a copper flux ring.

8. An apparatus for melting and pouring metal alloys comprising a furnace having bottom and sidewall portions defining a melt chamber to receive and melt metal therein, a pour opening located at the bottom portion of said furnace to permit removal of molten metal from said furnace, valve means cooperating with said pour opening for controlling the flow of molten metal from the pour opening of said furnace, said valve means including an upper stationary nozzle portion formed substantially from a refractory material and having an orifice therethrough aligned with said pour opening, a lower nozzle portion positioned below said upper stationary nozzle portion and adjacent thereto, said lower nozzle portion including an orifice therethrough, means mounting said lower nozzle portion for slidable movement along a lower face of said upper stationary nozzle portion to open and close said pour opening by slidably moving the lower nozzle orifice in and out of alignment with the upper nozzle orifice, induction heating means mounted in surrounding relationship to said refractory material upper stationary nozzle portion and cooperating therewith for inductively generating heat within the orifice of said upper stationary nozzle portion, an airtight housing enclosing said furnace and valve means, and means for evacuating said housing to allow melting and pouring of said molten metal within a vacuum.

9. An apparatus for melting and pouring metal alloys comprising a furnace having bottom and sidewall portions defining a melt chamber to receive and melt metal therein, induction heating means engaging sidewall portion of said furnace for providing heating to the interior of said melt chamber, a pour opening located at the bottom portion of said furnace to permit removal of molten metal from said furnace, valve means cooperating with said pour opening for controlling the flow of molten metal from the pour opening of said furnace, said valve means including an upper stationary nozzle portion formed substantially from a refractory material and having an orifice therethrough aligned with said pour opening, a lower nozzle portion positioned below said upper stationary nozzle portion and adjacent thereto, said lower nozzle portion including an orifice therethrough, means mounting said lower nozzle portion for slidable movement along a lower face of said upper stationary nozzle portion to open and close said pour opening by slidably moving the lower nozzle orifice in and out of alignment with the upper nozzle orifice, induction heating means mounted in surrounding relationship to said refractory material upper stationary nozzle portion and cooperating therewith for inductively generating heat within the orifice of said upper stationary nozzle portion, an airtight housing enclosing said furnace and said valve means, said airtight housing including an upper housing portion enclosing said furnace and said valve means, and a lower housing portion extending substantially below the bottom portion of said furnace, mold means positioned within said lower housing portion for receiving said molten metal from said furnace, and means for evacuating said upper and lower housing portions to allow melting and pouring of said molten metal within a vacuum.

10. The apparatus as claimed in claim 9 wherein said lower housing portion includes sidewall portions, and vacuum doors secured to said sidewall portions for gaining entry and egress to said lower housing portion.

11. The apparatus as claimed in claim 9 wherein said mold means includes a plurality of molds and means for transversely moving said molds under the lower nozzle portion for sequentially filling each of said molds with metal poured from said furnace.

12. The apparatus as claimed in claim 11 wherein said means for transversely moving said molds comprises a conveyor.

13. An apparatus for melting and pouring metal alloys comprising a furnace having bottom and sidewall portions defining a melt chamber to receive and melt metal therein, a pour opening located at the bottom portion of said furnace to permit removal of molten metal from said furnace, valve means cooperating with said pour opening for controlling the flow of molten metal from the pour opening of said furnace, said valve means including an upper stationary nozzle portion formed substantially from a refractory material which includes first and second replaceable refractory elements and having an orifice therethrough aligned with said pour opening, a metallic mounting plate engaging the bottom portion of said furnace to facilitate maintenance of said upper stationary nozzle portion in engagement with said pour opening, a lower nozzle portion positioned below said upper stationary nozzle portion and adjacent thereto, said lower nozzle portion including an orifice therethrough, means mounting said lower nozzle portion for slidable movement along a lower face of said upper stationary nozzle portion to open and close said pour opening by slidably moving the lower nozzle orifice in and out of alignment with the upper nozzle orifice, induction heating means mounted in surrounding relationship to said refractory material upper stationary nozzle portion and cooperating therewith for inductively generating heat within the orifice of said upper stationary nozzle portion, said induction heating means including means minimizing induction heating of said mounting plate, an airtight housing enclosing said furnace and valve means, and means for evacuating said housing to allow melting and pouring of said molten metal within a vacuum.

* * * * *

UNITED STATES PATENT AND TRADEMARK OFFICE
CERTIFICATE OF CORRECTION

PATENT NO. : 4,971,294

DATED : November 20, 1990

INVENTOR(S) : Frank Carlyle Sherrill

It is certified that error appears in the above-identified patent and that said Letters Patent is hereby corrected as shown below:

On the title page, under "References Cited" the following references should be listed:

| | | | |
|---|---|---|---|
| 2,676,011 | 4/1954  | Loftus et al.    | 266/236 |
| 2,745,153 | 5/1956  | Burkett          | 222/593 |
| 2,821,378 | 1/1958  | Tama             | 266/236 |
| 2,921,351 | 1/1960  | Momm             | 222/600 |
| 2,943,370 | 7/1960  | Murarsheed       | 222/600 |
| 3,435,992 | 4/1969  | Tisdale et al.   | 222/593 |
| 3,604,598 | 9/1971  | Kappmeyer et al. | 222/593 |
| 4,583,721 | 4/1986  | Arakawa et al.   | 222/600 |
| 4,632,283 | 12/1986 | Arakawa et al.   | 222/600 |
| 4,641,768 | 2/1987  | Hill             | 222/600 |

Column 7, line 25, "portion" should be -- portions --.

Signed and Sealed this

Fifth Day of January, 1993

Attest:

DOUGLAS B. COMER

Attesting Officer

Acting Commissioner of Patents and Trademarks